United States Patent
Xu et al.

(10) Patent No.: US 10,735,068 B2
(45) Date of Patent: *Aug. 4, 2020

(54) INTERACTION METHOD AND COMMUNICATION DEVICE

(71) Applicant: Beijing Zhigu Rui Tuo Tech Co., Ltd, Beijing (CN)

(72) Inventors: Ran Xu, Beijing (CN); Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 127 days.

This patent is subject to a terminal disclaimer.

(21) Appl. No.: 15/192,968

(22) Filed: Jun. 24, 2016

(65) Prior Publication Data

US 2016/0380679 A1    Dec. 29, 2016

(30) Foreign Application Priority Data

Jun. 25, 2015    (CN) .......................... 2015 1 0358060

(51) Int. Cl.
*H04B 7/06*    (2006.01)

(52) U.S. Cl.
CPC ................... *H04B 7/0617* (2013.01)

(58) Field of Classification Search
None
See application file for complete search history.

(56) References Cited

U.S. PATENT DOCUMENTS

| | | | |
|---|---|---|---|
| 6,738,044 B2 | 5/2004 | Holzrichter et al. | |
| 7,030,761 B2 | 4/2006 | Bridgelall et al. | |
| 7,193,504 B2 | 3/2007 | Carrender et al. | |
| 8,115,753 B2 | 2/2012 | Newton | |
| 8,432,929 B2 | 4/2013 | Wilson et al. | |
| 8,791,901 B2 | 7/2014 | Mallinson | |
| 8,994,583 B2 | 3/2015 | Bruce | |
| 9,560,445 B2 | 1/2017 | Raghuvanshi et al. | |
| 9,848,252 B2 | 12/2017 | Eggers et al. | |
| 9,921,657 B2 | 3/2018 | Sprenger et al. | |
| 9,921,660 B2 | 3/2018 | Poupyrev | |

(Continued)

FOREIGN PATENT DOCUMENTS

| | | | |
|---|---|---|---|
| CN | 101271620 A | 9/2008 | |
| CN | 102520798 A | 6/2012 | |

(Continued)

OTHER PUBLICATIONS

Tse, David et al. Fundamentals of Wireless Communication May 26, 2005 Cambridge University Press.*

(Continued)

*Primary Examiner* — Jeffrey M Rutkowski
*Assistant Examiner* — Basil Ma
(74) *Attorney, Agent, or Firm* — Amin, Turocy & Watson, LLP

(57) ABSTRACT

An interaction method and communication device are provided. An interaction method comprises: sending multiple different signals by a communication device, wherein the signals have different coverage areas, at least determining at least two signals in the multiple different signals received by another communication device, and at least according to the at least two signals, executing a corresponding command. An interaction solution is thereby provided.

38 Claims, 7 Drawing Sheets

(56) References Cited

U.S. PATENT DOCUMENTS

| | | | |
|---|---|---|---|
| 9,971,414 B2 | 5/2018 | Gollakota et al. | |
| 2006/0022815 A1 | 2/2006 | Fischer et al. | |
| 2011/0070840 A1* | 3/2011 | Nielsen .................. | H04B 7/028 455/67.11 |
| 2012/0015684 A1* | 1/2012 | Noji ....................... | H04B 7/028 455/524 |
| 2012/0213181 A1* | 8/2012 | Walton ................. | H04B 7/0413 370/329 |
| 2013/0106898 A1 | 5/2013 | Saint-Loubert-Bie et al. | |
| 2013/0120250 A1 | 5/2013 | Lin et al. | |
| 2013/0278504 A1 | 10/2013 | Tong et al. | |
| 2015/0131750 A1* | 5/2015 | Xue ..................... | H04B 7/0482 375/267 |
| 2016/0062488 A1* | 3/2016 | Zhao ..................... | G06F 3/0386 345/163 |
| 2017/0117891 A1* | 4/2017 | Lohbihler .............. | G08C 17/02 |

FOREIGN PATENT DOCUMENTS

| | | |
|---|---|---|
| CN | 103502911 A | 1/2014 |
| CN | 203416263 U | 1/2014 |
| CN | 103593126 A | 2/2014 |
| CN | 103604272 A | 2/2014 |
| CN | 103731711 A | 4/2014 |
| CN | 103944282 A | 7/2014 |
| CN | 104615005 A | 5/2015 |
| WO | 2013063372 A1 | 5/2013 |

OTHER PUBLICATIONS

Office Action dated Jan. 5, 2018 for U.S. Appl. No. 15/192,956, 28 pages.
Office Action dated Jul. 27, 2018 for U.S. Appl. No. 15/192,980, 32 pages.
Office Action dated Jul. 6, 2018 for U.S. Appl. No. 15/192,956, 20 pages.
Chinese Office Action for Chinese Application Serial No. 201510358032.3 dated Nov. 28, 2018, 9 pages.
Chinese Office Action for Chinese Application Serial No. 201510357562.6 dated Nov. 29, 2018, 9 pages.
Office Action dated Oct. 25, 2018 for U.S. Appl. No. 15/192,956, 22 pages.
Office Action dated Jan. 2, 2019 for U.S. Appl. No. 15/192,980, 24 pages.
Office Action dated Apr. 2, 2019 for U.S. Appl. No. 15/192,956, 35 pages.
Chinese Office Action for Chinese Application Serial No. 201510358060.5 dated Mar. 1, 2019, 7 pages.
Notice of Allowance dated Jun. 24, 2019 for U.S. Appl. No. 15/192,956, 29 pages.
Office Action dated Jun. 5, 2019 for U.S. Appl. No. 15/192,980, 33 pages.
Final Office Action received for U.S. Appl. No. 15/192,980 dated Oct. 18, 2019, 31 pages.

\* cited by examiner

INTERACTION METHOD AND COMMUNICATION DEVICE

RELATED APPLICATION

The present application claims the benefit of priority to Chinese Patent Application No. 201510358060.5, filed on Jun. 25, 2015, and entitled "Interaction Method and Communication Device", which application is hereby incorporated into the present application by reference herein in its entirety.

TECHNICAL FIELD

Embodiments of the present application relate to the technical field of interaction, and, for example, to an interaction method and a communication device.

BACKGROUND

Interaction between men and devices and interaction between the devices can be implemented in many manners. One vision-based interaction manner is that one device collects an image of a user or another device by a depth sensor to interact with the user or another device, and such interaction manner has high requirements on calculating complexity and hardware complexity of image collecting. In addition, use of wireless signals for interaction gains more and more attention of people, for example, a user action is recognized by detecting reflection echo features of a directionally sent wireless signal wave beam, thereby realizing the interaction with the user, but transmission distance of reflected signal is limited generally, and recognition precision is related to the distance, so that application thereof is limited.

SUMMARY

Considering this, an example, non-limiting object of embodiments of the present application aims to provide an interaction solution.

In this regard, a first aspect of example embodiments of the present application provides an interaction method, comprising:

sending multiple different signals by a communication device, wherein the multiple different signals have different coverage areas;

at least determining at least two signals in the multiple different signals received by another communication device; and at least according to the at least two signals, executing a corresponding command.

A second aspect of example embodiments of the present application provides a communication device, comprising:

a sending module, configured to send multiple different signals, wherein the multiple different signals have different coverage areas;

a first determining module, configured to at least determine at least two signals in the multiple different signals received by another communication device; and an executing module, configured to, at least according to the at least two signals, execute a corresponding command.

A third aspect of the embodiments of the present application provides a communication device, comprising:

at least one signal emitting source:

a memory, configured to store at least one program; and a processor, configured to execute the at least one program stored by the memory wherein the at least one program enables the processor to execute following operations:

controlling the at least one signal emitting source to send multiple different signals, wherein the multiple different signals have different coverage areas;

at least determining at least two signals in the multiple different signals received by another communication device; and at least according to the at least two signals, executing a corresponding command.

At least one of above example embodiments has example technical effects as follows:

According to example embodiments of the present application, by sending multiple different signals having different coverage areas by a communication device, at least determining at least two signals in the multiple different signals received by another communication device, and at least according to the at least two signals, executing a corresponding command, the interaction solution is provided. In addition, the communication device is controlled to execute the corresponding command based on the signal received by the other communication device from the communication device, therefore interaction distance is relatively flexible and the interaction solution is easy to realize.

DETAILED DESCRIPTION

The following further explains example embodiments of the present application in combination with accompanying drawings and embodiments. The following embodiments are intended to describe the present application rather than limiting a scope of the present application.

Figure 1:
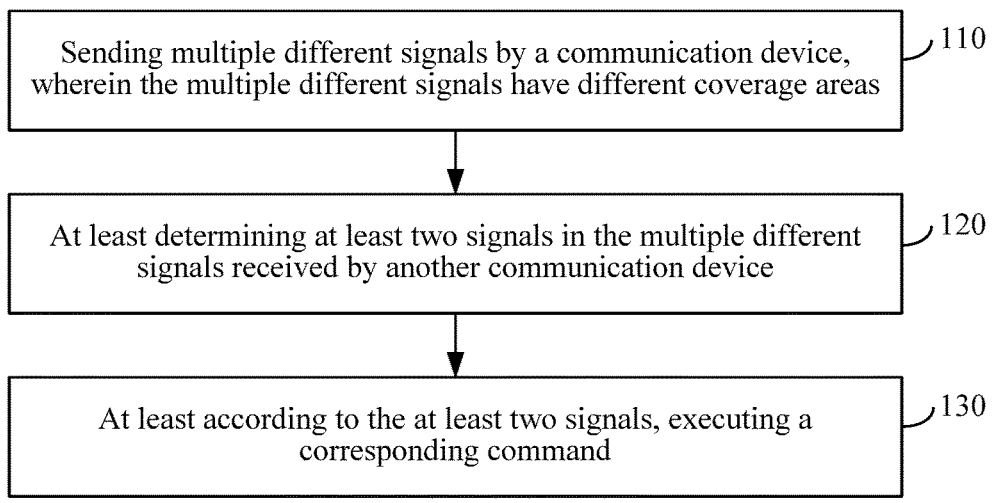
FIG. 1 is a flow schematic diagram of an example embodiment of an interaction method provided by the present application.

FIG. 1 is a flow schematic diagram of an example embodiment of an interaction method provided by the present application. As shown in FIG. 1, the present embodiment comprises:

110: sending multiple different signals by a communication device, wherein the multiple different signals have different coverage areas.

In the present embodiment, the communication device can be any device with a communication function, which comprises but not limited to a cellphone, a tablet computer, a smart television, a wearable device and a display.

In the present embodiment, the word "different" in the phase "multiple different signals" means that the multiple different signals carry different information.

In the present embodiment, the multiple different signals may be signals in any form. Optionally, the multiple different signals comprise but not limited to any one of the following: electromagnetic wave signals, light signals and sound wave signals, wherein the light signals comprise visible light signals and invisible light signals, and the sound wave signals comprise but not limited to ultrasonic wave signals.

Figure 2A:
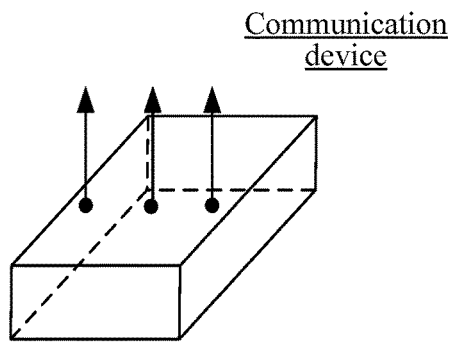
FIG. 2A, FIG. 2B and FIG. 2C each are example schematic diagrams of directions that each signal emitting source sends signal(s) in the present application.
Figure 2B:
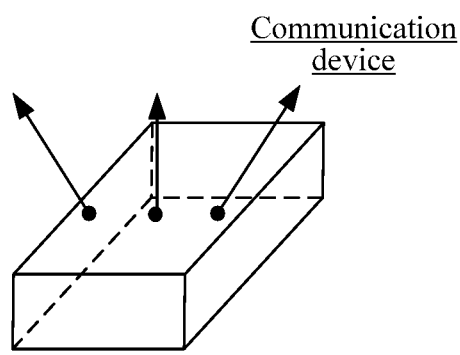
Figure 2C:
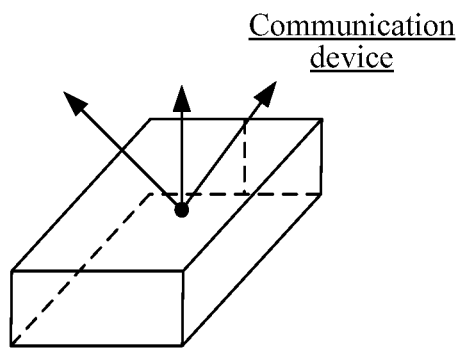

In the present embodiment, the communication device is usually provided with at least one signal emitting source, and the communication device specifically send the multiple different signals by the at least one signal emitting source. The type of the at least one signal emitting source relates to that of the multiple different signals emit by the at least one signal emitting source. Specifically, a signal emitting source emitting electromagnetic wave signals can be an antenna or an antenna array; a signal emitting source emitting light signals can be a light source or a light source array, for example a LED light source or LED light source array in an organic light-emitting diode (OLED) display or a light-emitting diode (LED) display; and a signal emitting source emitting sound wave signals can be a loudspeaker or a loudspeaker array. For example, the multiple different signals are visible light signals, the at least one signal emitting source is multiple LED light sources corresponding to different display regions in a display, correspondingly, the sending multiple different signals by a communication device specifically comprises: sending multiple visible light signals by the communication device through multiple LED light sources corresponding to different display regions in a display. In addition, sending directions of the multiple different signals are optionally the same or different. As shown in FIG. 2A, multiple signal emitting sources (shown by black dots in the figure, the same below) respectively send signals in a same direction, that is, the sending directions of the multiple different signals are parallel; and as shown in FIG. 2B, multiple signal emitting sources respectively send signals in different directions; and as shown in FIG. 2C, one signal emitting source sends at least two signals in at least two different directions.

In the present embodiment, the case that the multiple different signals have different coverage areas means that respective coverage areas of the multiple different signals are totally non-overlapped or the coverage areas of at least two signals are partially overlapped, in addition, the coverage areas of any two signals in the multiple different signals do not have an inclusion relation.

120: at least determining at least two signals in the multiple different signals received by another communication device.

In the present embodiment, the other communication device can be any device with a communication function, which comprises but not limited to a cellphone and a wearable device.

In the present embodiment, since the multiple different signals have different coverage areas, the other communication device respectively receives the at least two signals in at least two positions which are different relative to the communication device, and correspondingly, the at least two signals at least partially mark a moving track of the other communication device relative to the communication device.

130: at least according to the at least two signals, executing a corresponding command.

In the present embodiment, the command at least corresponds to the at least two signals, that is, the command corresponds to a moving track of the other communication device relative to the communication device.

According to the present embodiment, by sending multiple different signals having different coverage areas by a communication device, at least determining at least two signals in the multiple different signals received by another communication device, and at least according to the at least two signals, executing a corresponding command, the interaction solution is provided. In addition, the communication device is controlled to execute the corresponding command based on the signals received by the other communication device from the communication device, therefore interaction distance is relatively flexible and the interaction solution is easy to realize.

The method of the present embodiment is further described in some optional example embodiments as below.

In the present embodiment, the multiple different signals can be transmitted in multiple forms.

In one example embodiment, the multiple different signals are transmitted in a form of wave beam, correspondingly, the sending multiple different signals by a communication device comprises:

sending multiple different signals by the communication device through multiple wave beams, wherein the multiple wave beams are formed by at least one signal emitting source in the communication device.

Any signal emitting source in the at least one signal emitting source optionally forms one wave beam or at least two wave beams. If one signal emitting source forms at least two wave beams, then the at least wave beams are different in direction.

Similar to the coverage areas of the multiple different signals, the multiple wave beams are different in coverage area.

The type of the multiple wave beams relates to that of the multiple different signals. For example, the multiple different signals are electromagnetic wave signals, and the multiple wave beams are electromagnetic wave beams; the multiple different signals are light signals, and the multiple wave beams are light wave beams; and the multiple different signals are sound wave signals, and the multiple wave beams are sound wave beams. Correspondingly, along with difference of the type of the multiple wave beams, the communication device can form the multiple wave beams by adopting different techniques; by taking the electromagnetic wave beams as an example, the communication device can form the multiple electromagnetic wave beams by adopting an antenna array and a wave beam forming technique. Further, the multiple wave beams can be formed at the same time or different moments, for example, in sequence.

The multiple different signals can be sent through the multiple wave beams at the same time or different moments, for example, in sequence.

The multiple wave beams optionally correspond to the multiple different signals one to one, that is, the communication device sends a signal through each wave beam.

In the present example embodiment, optionally, before the sending multiple different signals by the communication device through multiple wave beams, the method further comprises:

determining the multiple wave beams to be formed by the at least one signal emitting source by the communication device.

The coverage area of each wave beam determines the coverage area of the signal sent through the wave beam, and the coverage area of each wave beam is usually decided by position of a signal emitting source forming the wave beam and direction and width of the wave beam. Correspondingly, the determining the multiple wave beams to be formed by the at least one signal emitting source by the communication device comprises: determining the at least one signal emitting source for forming the multiple wave beams, and directions and widths of the multiple wave beams by the communication device. Optionally, a projection direction of one light source can serve as the direction of the wave beam formed by the light source. By taking an electromagnetic wave beam as an example, width of the wave beam comprise a horizontal width and a vertical width.

Specifically, the communication device can determine the multiple wave beams to be formed by the at least one signal emitting source in many manners.

Figure 3A:
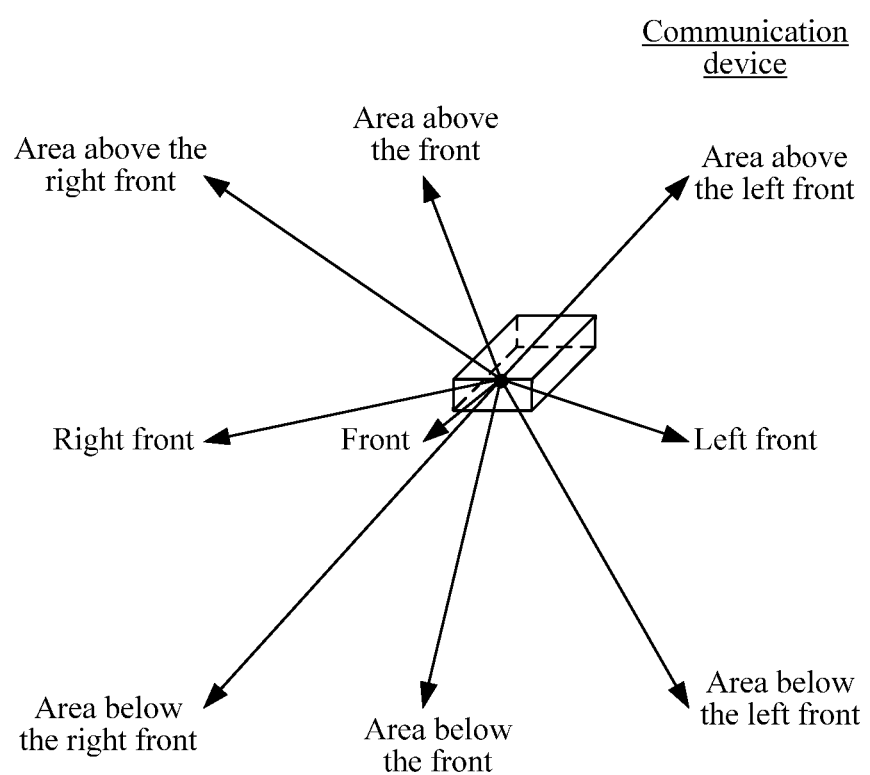
FIG. 3A is an example schematic diagram of directions of multiple wave beams formed by one signal emitting source in the present application.

In one possible scene, the multiple wave beams to be formed by the at least one signal emitting source are preset. For example, there are five signal emitting sources in the communication device, and each of the five signal emitting sources is preset to form one wave beam in preset direction and preset width. For another example, one signal emitting source in the communication device can form multiple wave beams of different directions, and the directions and widths of the multiple wave beams formed by the signal emitting source are preset; as shown in FIG. 3A, the directions of nine wave beams formed by one signal emitting source (shown by a black dot in the figure) in the communication device respectively point to the front, an area above the front, an area below the front, the left front, an area above the left front, an area below the left front, the right front, an area above the right front, and an area below the right front of the signal emitting source.

In another possible scene, the communication device determines the multiple wave beams to be formed by the at least one signal emitting source according to possible moving tracks of the other communication device. Correspondingly, the determining the multiple wave beams to be formed by the at least one signal emitting source by the communication device comprises:

determining multiple commands executable by the communication device;

determining multiple possible moving tracks of the other communication device corresponding to the multiple commands; and determining the multiple wave beams to be formed by the at least one signal emitting source according to the multiple possible moving tracks, wherein, each possible moving track corresponds to at least two wave beams in the multiple wave beams.

The determining the multiple wave beams to be formed by the at least one signal emitting source according to the multiple possible moving tracks at least comprises: determining the at least one signal emitting source for forming the multiple wave beams and directions of the multiple wave beams according to the multiple moving tracks. In addition, the widths of the multiple wave beams can be preset or determined according to the multiple possible moving tracks.

The multiple commands are optionally those commands that are probably executed by the communication device at that moment. Optionally, the multiple commands are determined according to a device state of the communication device. For example, when the device state is call in, the multiple commands optionally comprise but not limited to: call answering, call refusing and call ring muting; when the device state is song playing, the multiple commands optionally comprise but not limited to: playing pausing, playing stopping, next song playing and last song playing; when the device state is screen locking and closing, the multiple commands optionally comprise but not limited to: screen lighting on, screen lighting on and unlocking; when the device state is asking a user to select one from three options A, B and C, the multiple commands optionally comprise but not limited to: A option selecting, B option selecting and C option selecting.

The multiple possible moving tracks of the other communication device are the possible moving tracks of the other communication device relative to the communication device; the multiple possible moving tracks of the other communication device optionally correspond to the multiple commands one to one, or one of the multiple commands corresponds to at least two possible moving tracks in the multiple possible moving tracks. For example, the communication device is a cellphone, multiple signal emitting source are arranged at one surface of the communication device, the multiple commands comprise: call answering, call refusing and call ring muting, and a possible moving track corresponding to the command "call answering" is a transverse moving track parallel with the surface, a possible moving track corresponding to the command "call refusing" is a vertical moving track parallel with the surface, and a possible moving track corresponding to the command "call ring muting" is an L shaped moving track parallel with the surface, which are shown by dotted lines in FIG. 3B.

Figure 3B:
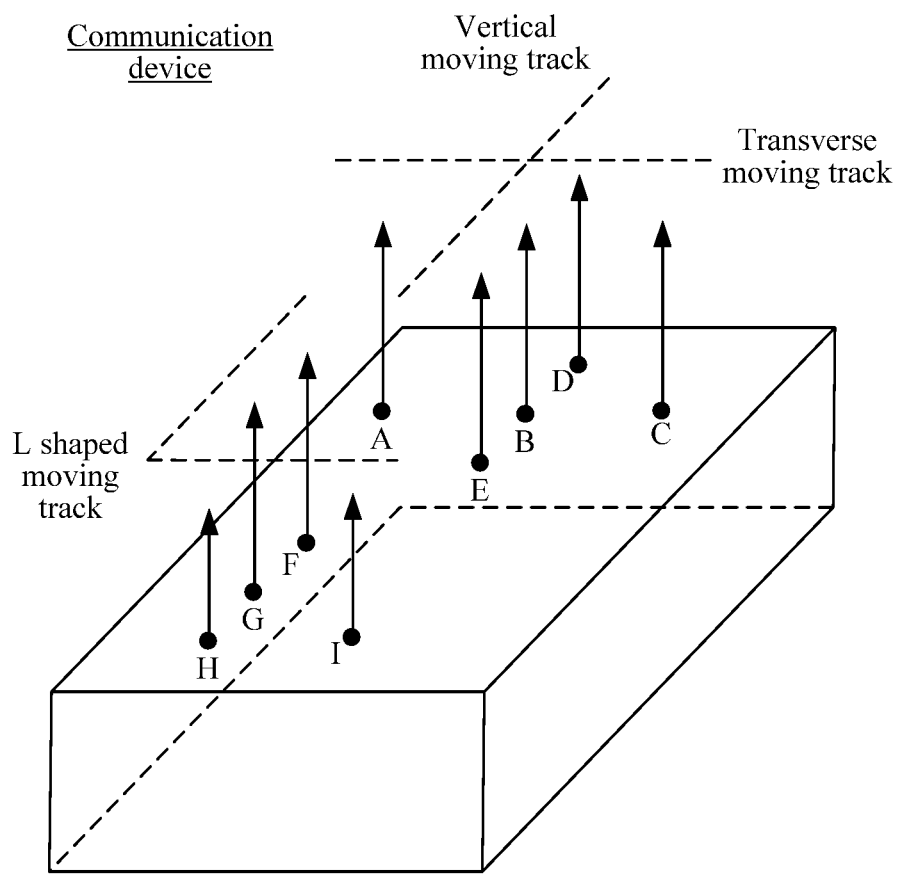
FIG. 3B is an example schematic diagram of multiple possible moving tracks and multiple wave beams determined according to the multiple possible moving tracks in the present application.

The case that each possible moving track corresponds at least two wave beams in the multiple wave beams means that, each possible moving track at least passes by the at least two coverage areas of the at least two wave beams. Specifically, each possible moving track is optionally marked by the at least two coverage areas of the at least two wave beams, or marked by the at least two coverage areas of the at least two wave beams and a passing sequence that the other communication device passes by the at least two coverage areas of the at least two wave beams. In the above example, further, according to the transverse moving track, three signal emitting sources A, B and C arrayed in a column and opposite to the transverse moving track are determined, and it is determined that directions of three wave beams to be respectively formed by the three signal emitting sources A, B and C are vertical to the surface, as shown in FIG. 3B; according to the vertical moving track, three signal emitting sources D, B and E arrayed in a column and opposite to the vertical moving track are determined, and it is determined that directions of three wave beams to be respectively formed by the three signal emitting sources D, B and E are vertical to the surface, as shown in FIG. 3B; and according to the L shaped moving track, four signal emitting sources F, G, H and I arrayed in a circle and opposite to the L shaped moving track are determined, and directions of four wave beams to be respectively formed by the three signal emitting sources F, G, H and I are vertical to the surface, as shown in FIG. 3B.

In the above scene(s) of determining the wave beams according to possible moving tracks, the determining multiple possible moving tracks can be implemented in multiple manners.

Optionally, the determining multiple possible moving tracks of the other communication device corresponding to the multiple commands comprises:

at least according to a current position of the other communication device relative to the communication device, determining the multiple possible moving tracks of the other communication device corresponding to the multiple commands.

The current position is optionally detected and determined by the communication device.

The current position can serve as one reference of the multiple possible moving tracks. Optionally, the multiple possible moving tracks each take the current position as starting points.

Optionally, the multiple possible moving tracks are preset and are unrelated to the current position of the other communication device relative to the communication device.

In the present embodiment, the command executed by the communication device in 130 optionally corresponds to the at least two signals only, or corresponds to the at least two signals and a receiving sequence that the other communication device receives the at least two signals. In the latter scene, optionally, the at least determining at least two signals in the multiple different signals received by the other communication device comprises:

determining the at least two signals received by the other communication device and a receiving sequence that the other communication device receives the at least two signals;

the at least according to the at least two signals, executing a corresponding command comprises:

at least according to the at least two signals and the receiving sequence, executing a corresponding command.

The receiving sequence that the other communication device receives the at least two signals is equivalent to the passing sequence that the other communication device moves to the at least two coverage areas of the at least two signals. That is, the moving track of the other communication device is marked by the at least two coverage areas of the at least two signals and the sequence that the other communication device respectively moves to the at least two coverage areas of the at least two signals.

The command corresponds to the at least two signals and the receiving sequence, that is, the command corresponds to the moving track of the communication device relative to the other communication device.

The determining the at least two signals and the receiving sequence can be implemented in multiple manners.

Optionally, the determining the at least two signals received by the other communication device and a receiving sequence that the other communication device receives the at least two signals comprises:

receiving the at least two signals returned in sequence by the other communication device; and determining the receiving sequence as a returning sequence that the other communication device returns the at least two signals.

The other communication device returns the at least two received signals received to the communication device in sequence according to the receiving sequence, for example, the other communication device instantly returns a signal to the communication device every time the other communication device receives the signal, correspondingly, for the communication device, the returning sequence that the other communication device returns the at least two signals is the receiving sequence that the other communication device receives the at least two signals.

The case that the other communication device returns the at least two signals optionally means that the other communication device returns the information carried in the at least two signals. For example, in 110, the multiple different signals sent by the communication device are multiple visible light signals, the at least two signals received by the other communication device are at least two visible light signals, correspondingly, the other communication device can directly return the at least two visible light signals received to the communication device, or demodulate the at least two visible light signals to obtain the information carried in the at least two visible light signals, carry the information in signals of any form, for example, the electromagnetic wave signals, sound wave signals and light signals, and return the signals carrying the information back to the communication device.

Optionally, the determining the at least two signals received by the other communication device and a receiving sequence that the other communication device receives the at least two signals comprises:

receiving the at least two signals and at least two receiving moments that the other communication device respectively receives the at least two signals, which are both returned by the other communication device; and according to the at least two receiving moments, determining the receiving sequence.

The case that the other communication device returns the at least two signals optionally means that the other communication device returns the information carried in the at least two signals. For example, in 110, the multiple different signals sent by the communication device are multiple visible light signals, the at least two signals received by the other communication device are at least two visible light signals, correspondingly, the other communication device can directly return the at least two visible light signals received and the receiving moments of the at least two signals to the communication device, or demodulate the at least two visible light signals to obtain the information, carry the information and the receiving moments of the at least two signals in signals of any form, for example, the electromagnetic wave signals, sound wave signals and light signals, and return the signals carrying the information and the receiving moments back to the communication device.

In the above scene(s) of considering the receiving sequence, the at least according to the at least two signals and the receiving sequence executing a corresponding command can be implemented in many manners.

Optionally, the at least according to the at least two signals and the receiving sequence of the at least two signals executing a corresponding command comprises:

at least according to the at least two signals and the receiving sequence, determining a moving track of the other communication device; and executing one command corresponding to the moving track.

On one aspect, the at least according to the at least two signals and the receiving sequence, determining a moving track of the other communication device optionally comprises:

determining at least two coverage areas of the at least two signals; and according to the at least two coverage areas of the at least two signals and the receiving sequence, determining a moving track of the other communication device.

The at least two coverage areas of the at least two signals can be marked in multiple manners. For example, in the scene(s) combining the above sending multiple different signals through multiple wave beams, the at least two coverage areas of the at least two signals are respectively equivalent to the at least two coverage areas of the at least two wave beams for sending the at least two signals; since the widths of the at least two wave beams are probably the same, if the at least two wave beams are formed by one signal emitting source, the at least two coverage areas of the at least two wave beams are optionally marked by directions of the at least two wave beams only, if the at least two wave beams are formed by multiple signal emitting sources, each of the at least two coverage areas of the at least two wave beams is optionally marked by position of a signal emitting source forming the wave beam and direction of the wave beam.

Figure 3C:
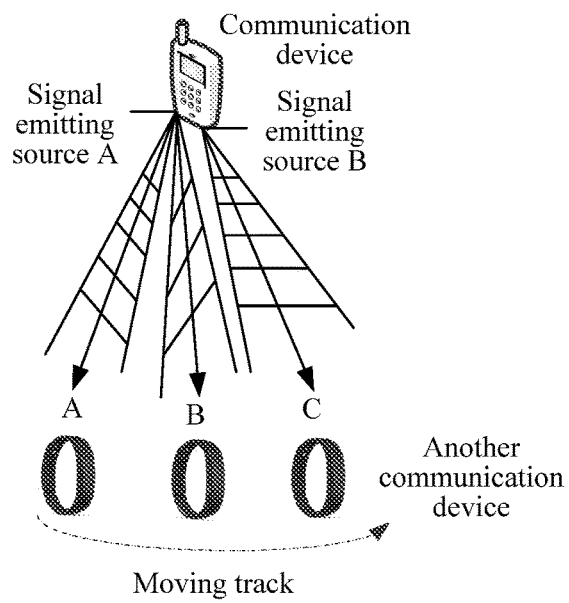
FIG. 3C is an example schematic diagram of a moving track of another communication device in the present application.

For example, the other communication device receives a first signal, a second signal and a third signal sent by the communication device in sequence, the communication device determines that a first wave beam for sending the first signal is formed by a signal emitting source A and has a direction A and a first width, a second wave beam for sending the second signal is formed by the signal emitting source A and has a direction B and a second width, and a third wave beam for sending the third signal is formed by the signal emitting source A and has a direction C and a third width, correspondingly, it is determined that the moving track of the other communication device is from the coverage area of the first wave beam to the coverage area of the third wave beam via the coverage area of the second wave beam, as shown by dotted lines in FIG. 3C, wherein the coverage area of the first wave beam is defined by the position of the signal emitting source A, the direction A and the first width as shown by a backslash filling region in FIG. 3C, the coverage area of the second wave beam is defined by the position of the signal emitting source A, the direction B and the second width as shown by a slash filling region in FIG. 3C, and the coverage area of the third wave beam is defined by the position of the signal emitting source A, the direction C and the third width as shown by a horizontal stripe filling region in FIG. 3C.

On another aspect, the executing one command corresponding to the moving track optionally comprises:

at least according to a device state of the communication device and the moving track, determining one command corresponding to the moving track under the device state; and executing the command.

The device state can refer to the device state mentioned in the above determining multiple commands executable by the communication device. Specifically, since the multiple commands executable by the communication device under different device states may be different, the same moving track of the other communication device may corresponds to different commands under different device states of the communication device. For example, when the device state of the communication device is call in, one command corresponding to a moving track of the other communication device under the device state of call in is call answering, and when the device state of the communication device is song playing, one command corresponding to the same moving track under the device state of song playing is next song playing.

In scene(s) combining the above receiving sequence and the above determining the multiple wave beams according to the multiple possible moving tracks, optionally, the method further comprises:

determining a first sequence corresponding to each of the multiple commands;

aiming at each command, according to at least two wave beams corresponding to one possible moving track corresponding to the command and a corresponding order of the at least two wave beams to the possible moving track, dividing a first sequence corresponding to the command into at least two subsequences corresponding to the at least two wave beams one to one; and respectively modulating the at least two subsequences into at least two signals corresponding to the at least two wave beams.

Each command corresponds to one first sequence, and first sequences corresponding to different commands are optionally different.

Any command optionally corresponds to one possible moving track, or at least two possible moving tracks. In the scene(s) that a command corresponds to at least two possible moving tracks, for any two possible moving tracks in the at least two possible moving tracks, at least two wave beams corresponding to one of the two moving tracks are optionally the same as those corresponding to the other, but the two respective corresponding orders of the same at least two wave beams to the two possible moving tracks are different, or, at least two wave beams corresponding to one of the two possible moving tracks are totally different from those corresponding to the other; the at least two possible moving tracks can be grouped according to the fact whether their respectively corresponding at least two wave beams are totally the same, and one possible moving track is selected from each group to perform the step of dividing the first sequence.

One signal corresponding to each wave beam is the signal to be sent through the wave beam in 110.

For example, a first sequence corresponding to one command is {1, 3, 5, 7, 9, 11}, the command corresponds to two possible moving tracks called as track 1 and track 2, wherein track 1 is from a coverage area of wave beam A to a coverage area of wave beam B, track 2 is from a coverage area of the wave beam C to a coverage area of wave beam D, the coverage areas of wave beams A, B, C and D are different, then the first sequence is divided into two subsequences according to a corresponding order of wave beams A and B to track 1, specifically, one subsequence {1, 3, 5} corresponds to wave beam A and another subsequence {7, 9, 11} corresponds to wave beam B; the first sequence is divided into two subsequences according to a corresponding order of wave beams C and D to track 2, specifically, one subsequence {1, 3, 5} corresponds to wave beam C and another subsequence {7, 9, 11} corresponds to wave beam D, and further, the subsequence {1, 3, 5} is modulated in the signals respectively corresponding to wave beams A and C, the subsequence {7, 9, 11} is demodulated in the signals respectively corresponding to wave beams B and D.

In the scene(s) combining the above receiving sequence and the above dividing a first sequence corresponding to the command, optionally, the determining the at least two signals received by the other communication device and a receiving sequence that the other communication device receives the at least two signals comprises:

receiving a second sequence from the other communication device, wherein the second sequence is made up of at least two subsequences carried in the at least two signals according to the receiving sequence by the other communication device.

Further, the at least according to the at least two signals and the receiving sequence, executing a corresponding command comprises:

determining a command corresponding to the second sequence; and executing the command.

The second sequence is optionally the same as a first sequence corresponding to one of the multiple commands. For example, when the other communication device moves along any one possible moving track in the multiple possible moving tracks corresponding to the multiple commands, the second sequence is the same as a first sequence, which means that the command corresponding to the second sequence is a command corresponding to the first sequence.

The second sequence is optionally different from any first sequence corresponding to one of the multiple commands. For example, when the other communication device does not move along any one possible moving track in the multiple possible moving tracks corresponding to the multiple commands, the second sequence is different from any first sequence in the multiple first sequences, which means that the second sequence does not correspond to any command in the multiple commands, and correspondingly, the communication device does not execute any command in the multiple commands.

In the scene(s) combining the above receiving sequence and dividing a first sequence corresponding to the command, optionally, the at least according to the at least two signals and the receiving sequence, executing one corresponding command comprises:

combining at least two subsequences carried in the at least two signals into a third sequence according to the receiving sequence;

determining a command corresponding to the third sequence; and executing the command.

The third sequence is optionally the same as a first sequence corresponding to one of the multiple commands. For example, when the other communication device moves along any one possible moving track in the multiple possible moving tracks corresponding to the multiple commands, the third sequence is the same as a first sequence, which means that the command corresponding to the third sequence is a command corresponding to the first sequence.

The third sequence is optionally different from any first sequence corresponding to one of the multiple commands. For example, when the other communication device does not move along any one possible moving track in the multiple possible moving tracks corresponding to the multiple commands, the third sequence is different from any first sequence in the multiple first sequences, which means that the third sequence does not correspond to any command in the multiple commands, and correspondingly, the communication device does not execute any command in the multiple commands.

In the example embodiment of sending multiple different signals through multiple wave beams, the communication device sends the multiple different signals through the multiple wave beams optionally at different moments.

Further in combination with the scene(s) of determining the wave beams according to the possible moving tracks, optionally, in at least two wave beams corresponding to each possible moving track, the communication device sends a signal through an initial wave beam, and then sends another signal through the next wave beam after acknowledging that the other communication device receives the signal sent through the initial wave beam, and so on. Correspondingly, the sending multiple different signals by the communication device through multiple wave beams comprises: sending at least one first signal by the communication device through at least one first wave beam, wherein the at least one first wave beam comprises at least one initial wave beam in at least two wave beams corresponding to each of the multiple possible moving tracks;

the determining the at least two signals received by the other communication device and a receiving sequence that the other communication device receives the at least two signals comprises: receiving from the other communication device a first acknowledging signal for acknowledging a first signal;

The sending multiple different signals by the communication device through multiple wave beams further comprises: sending at least one second signal by the communication device through at least one second wave beam, the at least one second wave beam comprises at least one next wave beam of a first wave beam in at least one possible moving track, the first signal received by the other communication device is sent by the communication device through the first wave beam, each of the at least one possible moving track takes the first wave beam as the initial wave beam;

the determining the at least two signals received by the other communication device and a receiving sequence that the other communication device receives the at least two signals further comprises: receiving from the other communication device a second acknowledging signal for acknowledging a second signal.

In the at least two wave beams corresponding to each possible moving track, if moving along the possible moving track, the other communication device usually arrives at the coverage area of the initial wave beam firstly and then enters the coverage area of the next wave beam of the initial wave beam, and so on.

The at least one first wave beam can be one first wave beam or multiple first wave beams. Specifically, if each of the multiple possible moving tracks takes the same wave beam as the initial wave beam, then the at least one first wave beam is one first wave beam, that is the same wave beam; and if at least two possible moving tracks in the multiple possible moving tracks take different wave beams as the initial wave beams, then the at least one first wave beam is multiple first beams.

The at least one second wave beam can be one second wave beam or multiple second wave beams. Specifically, if only one possible moving track in the multiple possible moving tracks takes the first wave beam as the initial wave beam, or the next wave beams of the first wave beam in the at least two possible moving tracks taking the first wave beam as the initial wave beams are the same, the first signal the other communication device receives is sent through the first wave beam, then the at least one second wave beam is one second wave beam; and if the next wave beams of the first wave beam in the at least two possible moving tracks are different, then the at least one second wave beam is multiple second wave beams.

Further, if at least two possible moving tracks in the multiple possible moving tracks each take the first wave beam as the initial wave beam and a second wave beam as the next wave beam of the initial wave beam, the second signal the other communication device receives is sent through the second wave beam, then the sending multiple different signals by the communication device through multiple wave beams optionally further comprises: sending at least one third signal by the communication device through at least one third wave beam, wherein the at least one third wave beam comprises at least one next wave beam of a second wave beam in at least one possible moving track, the at least one possible moving track each takes the first wave beam as the initial way beam and the second wave beam as the next wave beam of the initial wave beam; the determining the at least two signals received by the other communication device and a receiving sequence that the other communication device receives the at least two signals further comprises: receiving from the other communication device a third acknowledging signal for acknowledging a third signal.

In one application scene of the present embodiment, a cellphone placed on a desk by a user is taken as the communication device in the present embodiment, a smart bracelet worn on a wrist of the user is taken as the other communication device in the present embodiment; when the user cooks, the cellphone on the desk receives a call, the cellphone sends multiple different signals in multiple directions, if the user does not want to answer the call and does not want to touch the cellphone, the user can only slide the worn smart bracelet along a certain track; the smart bracelet receives at least two signals in the multiple different signals in a corresponding receiving sequence in the process of sliding along the certain track, in addition, every time the smart bracelet receives one signal, the signal is returned to the cellphone; and the cellphone determines the at least two signals received by the smart bracelet and the receiving sequence that the smart bracelet receives the at least two signals, thereby executing a corresponding command, that is, call refusing.

In another application scene of the present embodiment, one electronic advertisement board serves as the communication device in the present embodiment, which adopts an LED array display, a cellphone of a user is taken as the other communication device in the present embodiment; when the user comes to the electronic advertisement board, the LED array display in the electronic advertisement board displays a commodity and multiple LED light sources corresponding to different display regions in the LED array display send multiple different visible light signals in an outward direction vertical to a display plane of the LED array display; if the user is interested in the commodity being displayed by the LED array display and wants to know about position information of the commodity, then the user can hold the cellphone to transversely slide in front of the LED array display, in the transversely sliding process, the cellphone receives at least two visible light signals respectively sent by at least two LED light sources in a corresponding receiving sequence, in addition, every time the cellphone receives one visible light signal, the visible light signal is returned to the electronic advertisement board immediately, and the electronic advertisement board determines the at least two visible light signals received by the cellphone and the receiving sequence that the cellphone receives the at least two visible light signals, thereby executing a corresponding command, that is, displaying the position information of the commodity; if the user is interested in the commodity being displayed by the LED array display and wants to know about discounting information of the commodity, then the user can hold the cellphone to vertically slide in front of the LED array display, in the vertically sliding process, the cellphone receives at least two visible light signals sent by at least two LED light sources in a corresponding receiving sequence, in addition, every time the cellphone receives one visible light signal, the visible light signal is returned to the electronic advertisement board immediately, and the electronic advertisement board determines the at least two visible light signals received by the cellphone and the receiving sequence that the cellphone receives the at least two visible light signals, thereby executing a corresponding command, that is, displaying the discounting information of the commodity.

Figure 4:
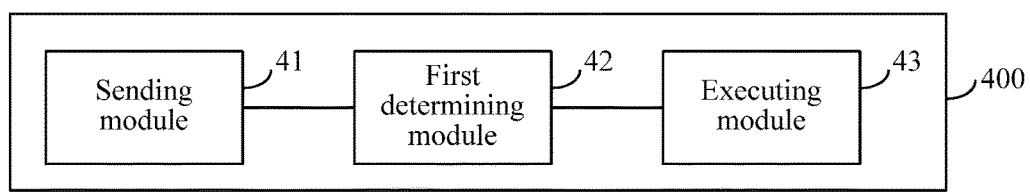
FIG. 4 is an example structural schematic diagram of a first embodiment of a communication device provided by the present application.

FIG. 4 is a structural schematic diagram of a first embodiment of a communication device provided by the present application. As shown in FIG. 4, the communication device comprises:

a sending module 41, configured to send multiple different signals, wherein the multiple different signals have different coverage areas;

a first determining module 42, configured to at least determine at least two signals in the multiple different signals received by another communication device; and an executing module 43, configured to, at least according to the at least two signals, execute a corresponding command.

In the present embodiment, the communication device 400 can be any device with a communication function, which comprises but not limited to a cellphone, a tablet computer, a smart television, a wearable device and a display.

In the present embodiment, the word "different" in the phase "multiple different signals" means that the multiple different signals carry different information.

In the present embodiment, the multiple different signals may be signals in any form. Optionally, the multiple different signals comprise but not limited to any one of the following: electromagnetic wave signals, light signals and sound wave signals, wherein the light signals comprise visible light signals and invisible light signals, and the sound wave signals comprise but not limited to ultrasonic wave signals.

In the present embodiment, the communication device is usually provided with at least one signal emitting source, and the communication device specifically send the multiple different signals by the at least one signal emitting source. The type of the at least one signal emitting source relates to that of the multiple different signals emit by the at least one signal emitting source. Specifically, a signal emitting source emitting electromagnetic wave signals can be an antenna or an antenna array; a signal emitting source emitting light signals can be a light source or a light source array, for example a LED light source or LED light source array in an organic light-emitting diode (OLED) display or a light-emitting diode (LED) array display; and a signal emitting source emitting sound wave signals can be a loudspeaker or a loudspeaker array. For example, the multiple different signals are visible light signals, the at least one signal emitting source is multiple LED light sources corresponding to different display regions in a display, correspondingly, the sending module 41 is specifically configured to send multiple visible light signals through multiple LED light sources corresponding to different display regions in a display. In addition, sending directions of the multiple different signals are optionally the same or different. As shown in FIG. 2A, multiple signal emitting sources (shown by black dots in the figure) respectively send signals in a same direction, that is, the sending directions of the multiple different signals are parallel; and as shown in FIG. 2B, the multiple signal emitting sources respectively send signals in different directions; and as shown in FIG. 2C, one signal emitting source sends at least two signals in at least two different directions.

In the present embodiment, the case that the multiple different signals have different coverage areas means that respective coverage areas of the multiple different signals are totally non-overlapped or the coverage areas of at least two signals are partially overlapped, in addition, the coverage areas of any two signals in the multiple different signals do not have an inclusion relation.

In the present embodiment, the other communication device can be any device with a communication function, which comprises but not limited to a cellphone and a wearable device.

In the present embodiment, since the multiple different signals have different coverage areas, the other communication device respectively receives the at least two signals in at least two positions which are different relative to the communication device 400, and correspondingly, the at least two signals at least partially mark a moving track of the other communication device relative to the communication device 400.

In the present embodiment, the command at least corresponds to the at least two signals, that is, the command corresponds to a moving track of the other communication device relative to the communication device 400.

According to the present embodiment, by sending multiple different signals having different coverage areas by a communication device, at least determining at least two signals in the multiple different signals received by another communication device, and at least according to the at least two signals, executing a corresponding command, the interaction solution is provided. In addition, the communication device is controlled to execute the corresponding command based on the signals received by the other communication device from the communication device, therefore interaction distance is relatively flexible and the interaction solution is easy to realize.

The communication device 400 of the present embodiment is further described in some optional example embodiments as below.

In the present embodiment, the multiple different signals can be transmitted in multiple forms.

In one example embodiment, the multiple different signals are transmitted in a form of wave beam, correspondingly, the sending module 41 is specifically configured to:

send multiple different signals through multiple wave beams, wherein the multiple wave beams are formed by at least one signal emitting source in the communication device.

Figure 5A:
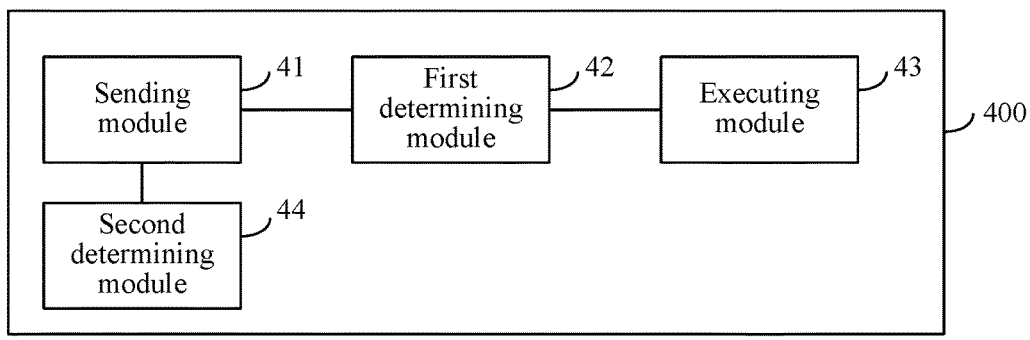
FIG. 5A-FIG. 5D each are structural schematic diagrams of example embodiments of the present application as shown in FIG. 4.

In the present example embodiment, optionally, as shown in FIG. 5A, the communication device 400 further comprises:

a second determining module 44, configured to determine the multiple wave beams to be formed by the at least one signal emitting source.

Specifically, the second determining module 44 has multiple example embodiments to determine the multiple wave beams to be formed by the at least one signal emitting source.

In one possible scene, the multiple wave beams to be formed by the at least one signal emitting source are preset.

Figure 5B:
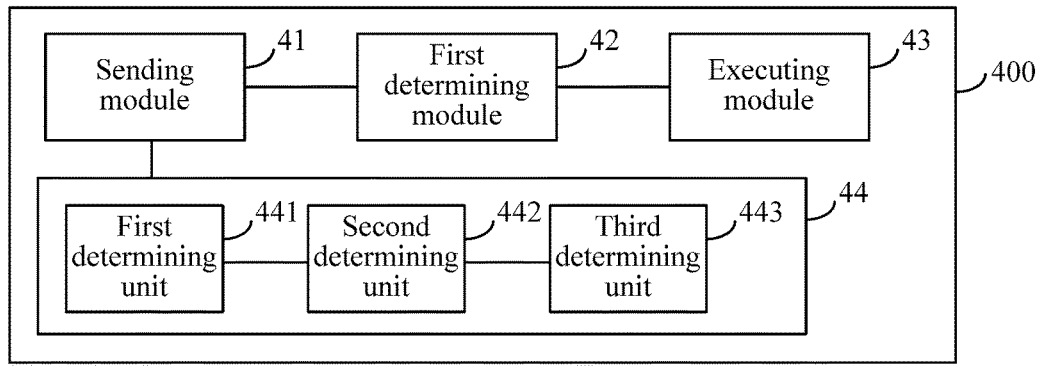

In another possible scene, the communication device determines the multiple wave beams to be formed by the at least one signal emitting source according to possible moving tracks of the other communication device. Correspondingly, as shown in FIG. 5B, the second determining module 44 comprises:

a first determining unit 441, configured to determine multiple commands executable by the executing module 43;

a second determining unit 442, configured to determine multiple possible moving tracks of the other communication device corresponding to the multiple commands; and a third determining unit 443, configured to determine the multiple wave beams to be formed by the at least one signal emitting source according to the multiple possible moving tracks, wherein, each possible moving track corresponds to at least two wave beams in the multiple wave beams.

In the above scene(s) of determining the wave beams according to possible moving tracks, the second determining unit 442 has multiple example embodiments to determine the possible moving tracks.

Optionally, the second determining unit 442 is specifically configured to:

at least according to a current position of the other communication device relative to the communication device, determine the multiple possible moving tracks of the other communication device corresponding to the multiple commands.

In the present embodiment, the command executed by the executing module 43 optionally corresponds to the at least two signals only, or corresponds to the at least two signals and a receiving sequence that the other communication device receives the at least two signals. In the latter scene, optionally, the first determining module 42 is specifically configured to determine the at least two signals received by the other communication device and a receiving sequence that the other communication device receives the at least two signals;

the executing module 43 is specifically configured to, at least according to the at least two signals and the receiving sequence, execute a corresponding command.

The first determining module 42 has multiple example embodiments to determine the at least two signals and the receiving sequence.

Optionally, the first determining module 42 is specifically configured to receive the at least two signals returned in sequence by the other communication device; and determine the receiving sequence as a returning sequence that the other communication device returns the at least two signals.

Optionally, the first determining module 42 is specifically configured to receive the at least two signals and at least two receiving moments that the other communication device respectively receives the at least two signals, which are both returned by the other communication device; and according to the at least two receiving moments, determine the receiving sequence.

In the above scene(s) of considering the receiving sequence, the executing module 43 has many example embodiments to execute the corresponding command at least according to the at least two signals and the receiving sequence.

Figure 5C:
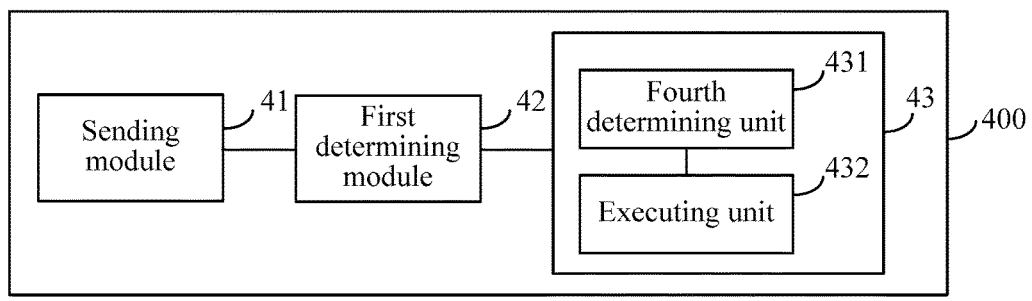

Optionally, as shown in FIG. 5C, the executing module 43 comprises:

a fourth determining unit 431, configured to, at least according to the at least two signals and the receiving sequence, determine a moving track of the other communication device; and an executing unit 432, configured to execute one command corresponding to the moving track.

On one aspect, the fourth determining unit 431 is specifically configured to:

determine at least two coverage areas of the at least two signals; and according to the at least two coverage areas of the at least two signals and the receiving sequence, determine a moving track of the other communication device.

On another aspect, optionally, the executing unit 432 is specifically configured to:

at least according to a device state of the communication device 400 and the moving track, determine one command corresponding to the moving track under the device state; and execute the command.

Figure 5D:
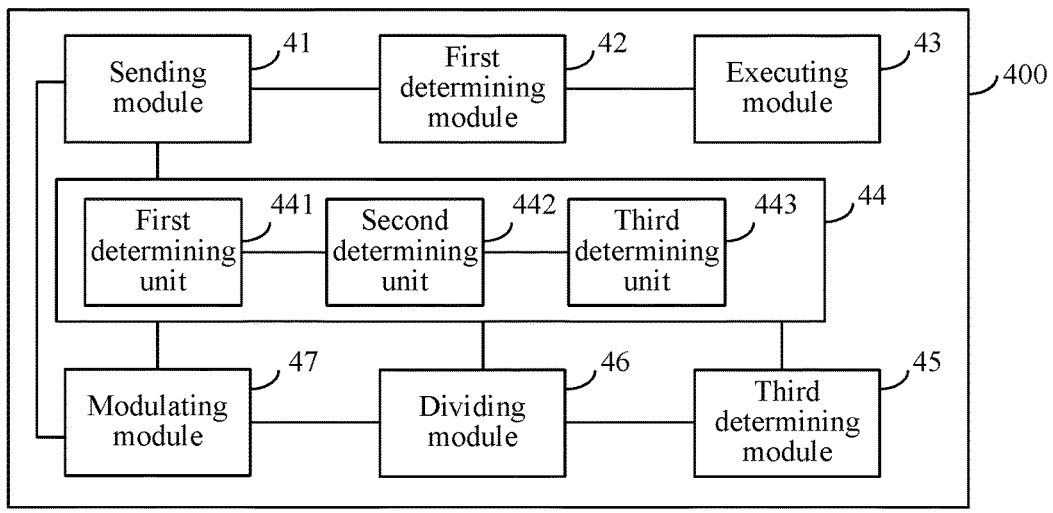

In scene(s) combining the above receiving sequence and the above determining the wave beams according to possible moving tracks, optionally, as shown in FIG. 5D the communication device 400 further comprises:

a third determining module 45, configured to determine a first sequence corresponding to each of the multiple commands;

a dividing module 46, configured to aiming at each command, according to at least two wave beams corresponding to one possible moving track corresponding to the command and a corresponding order of the at least two wave beams to the possible moving track, divide the first sequence corresponding to the command into at least two subsequences corresponding to the at least two wave beams one to one; and a modulating module 47, configured to respectively modulate the at least two subsequences into at least two signals corresponding to the at least two wave beams.

In scenes combining the above receiving sequence and the above dividing first sequences, optionally, the first determining module 42 is specifically configured to:

receive a second sequence from the other communication device, wherein the second sequence is made up of the at least two subsequences carried in the at least two signals e according to the receiving sequence by the other communication device.

Further, the executing module 43 is specifically configured to determine a command corresponding to the second sequence; and execute the command.

In scene(s) combining the above receiving sequence and the above dividing first sequences, optionally, the executing module 43 is specifically configured to combine at least two subsequences carried in the at least two signals into a third sequence according to the receiving sequence;

determine a command corresponding to the third sequence; and execute the command.

In the above example embodiment of sending the signals through the wave beams, the sending module 41 sends the multiple different signals through the multiple wave beams optionally at different moments.

Further in combination with the scene(s) of determining the wave beams according to the possible moving tracks, optionally, in at least two wave beams corresponding to each possible moving track, the sending module 41 sends a signal through an initial wave beam, and then sends another signal through a next wave beam after the first determining module 42 confirms that the other communication device receives the signal sent through the initial wave beam, and so on. Correspondingly, the sending module 41 is specifically configured to: send at least one first signal through at least one first wave beam, wherein the at least one first wave beam comprises at least one initial wave beam in at least two wave beams corresponding to each of the multiple possible moving tracks;

the first determining module 42 is specifically configured to receive from the other communication device a first acknowledging signal for acknowledging a first signal;

the sending module 41 is further specifically configured to send at least one second signal through at least one second wave beam, the at least one second wave beam comprises at least one next wave beam of a first wave beam in at least one possible moving track, the first signal received by the other communication device is sent by the sending module 41 through the first wave beam, each of the at least one possible moving track takes the first wave beam as the initial wave beam;

the first determining module 42 is specifically configured to receive from the other communication device a second acknowledging signal for acknowledging a second signal.

Each example embodiment and each scene in the present embodiment can specifically refer to the corresponding description in the above embodiment of the interaction method provided by the present application.

Figure 6:
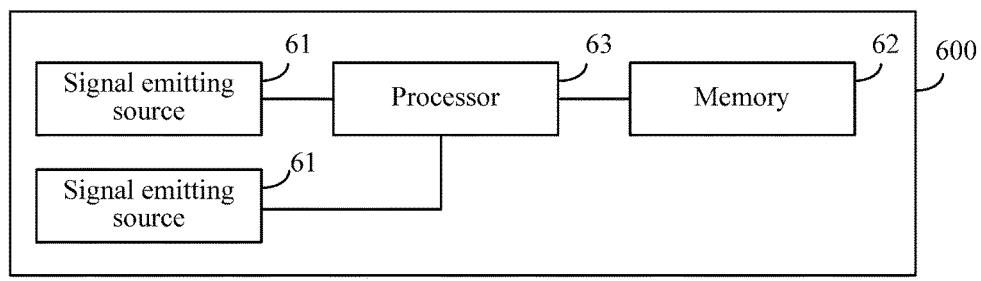
FIG. 6 is a structural schematic diagram of a second example embodiment of a communication device provided by the present application.

FIG. 6 is a structural schematic diagram of a second embodiment of a communication device provided by the present application. As shown in FIG. 6, the communication device 600 comprises:

at least one signal emitting source 61:

a memory 62, configured to store at least one program; and a processor 63, configured to execute the at least one program stored by the memory 62, wherein the at least one program enables the processor 63 to execute following operations:

controlling the at least one signal emitting source 61 to send multiple different signals, wherein the multiple different signals have different coverage areas;

at least determining at least two signals in the multiple different signals received by another communication device; and at least according to the at least two signals, executing a corresponding command.

In the present embodiment, the communication device 600 can be any device with a communication function, which comprises but not limited to a cellphone, a tablet computer, a smart television, a wearable device and a display.

It should be noted that FIG. 6 only illustrates with two signal emitting sources 61, which is not intended to limit the number of the signal emitting source 61 in the communication device 600.

In the present embodiment, the type of the signal emitting source 61 relates to that of the signal(s) emit by the signal emitting source 61. For example, a signal emitting source 61 emitting electromagnetic wave signals can be an antenna or an antenna array; a signal emitting source 61 emitting light signals can be a light source or a light source array, for example, a LED light source or LED light source array in an OLED display or a LED array display; and a signal emitting source 61 emitting sound wave signals can be a loudspeaker or a loudspeaker array. For example, the multiple different signals are multiple visible light signals, the at least one signal emitting source 61 is multiple signal emitting sources 61 and is specifically multiple LED light sources corresponding to different display regions in a display.

In the present embodiment, the memory 62 can optionally comprise a random-access memory (RAM), and optionally further comprise a non-volatile memory, for example, at least one disk storage.

In the present embodiment, the processor 63 can be a central processing unit (CPU), or an application specific integrated circuit (ASIC), or one or more integrated circuits configured to execute above operations. The above operations that the at least one program enables the processor 63 to execute can refer to corresponding description in the above embodiment of an interaction method and is not repeated herein.

Figure 7:
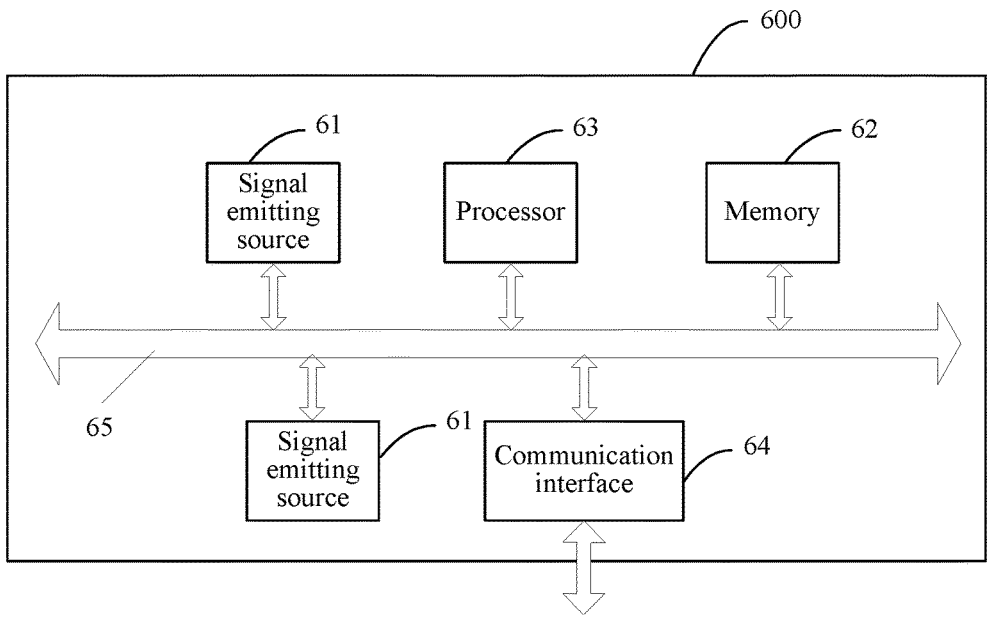
FIG. 7 is a structural schematic diagram of an example embodiment of the present application as shown in FIG. 6.

In one example embodiment, as shown in FIG. 7, the communication device 600 further comprises a communication interface 64 and a communication bus 65, wherein multiple signal emitting sources 61, the memory 62, the processor 63 and the communication interface 64 perform communication and control with each other by the communication bus 65.

Effective effects of the present embodiment refer to the corresponding description of the embodiment of an interaction method provided by the present application.

A person of ordinary skill in the art may be aware that, in combination with the examples described in the embodiments disclosed in this specification, units and method steps can be implemented by electronic hardware or a combination of computer software and electronic hardware. Whether these functions are implemented by hardware or software depends on specific applications and design constraint conditions of the example embodiment. A person skilled in the art may use different methods to implement the described functions for each specific application, but such implementation should not be construed as a departure from the scope of the present application.

If the functions are implemented in the form of software functional unit and are sold or used as an independent product, the product can be stored in a computer-readable storage medium. Based on this understanding, the example embodiment of {\kerning2 the present application} essentially, or the part that contributes to the prior art, or a part of the example embodiment may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), a diskette or a compact disk and other mediums capable of storing a program code.

The foregoing example embodiments are used to describe present application, but not to limit the present application. A person of ordinary skill in the art can still make various alterations and modifications without departing from the spirit and scope of the present application; therefore, all equivalent example embodiments also fall within the scope of the present application, and the patent protection scope of present application should be subject to the claims.

What is claimed is:

1. A method, comprising:
 sending multiple different signals by a communication device comprising a processor through multiple wave beams, wherein the multiple different signals have different coverage areas, and the multiple wave beams are formed by at least one signal emitting source in the communication device;
 at least determining at least two signals in the multiple different signals received by another communication device and a receiving sequence in which the other communication device receives the at least two signals, wherein the receiving sequence represents a passing sequence that the other communication device respectively moves among at least two coverage areas of the at least two signals; and
 executing a command at least corresponding to the coverage areas of the at least two signals and the receiving sequence,
 wherein the sending the multiple different signals by the communication device through the multiple wave beams comprises: sending at least one first signal by the communication device through at least one first wave beam, wherein the at least one first wave beam comprises at least one initial wave beam in at least two wave beams corresponding to each of the multiple possible moving tracks;
 wherein the determining the at least two signals received by the other communication device and the receiving sequence in which the other communication device receives the at least two signals comprises: receiving from the other communication device a first acknowledging signal for acknowledging a first signal;
 wherein the sending the multiple different signals by the communication device through multiple wave beams further comprises: sending at least one second signal by the communication device through at least one second wave beam, the at least one second wave beam comprises at least one next wave beam of a first wave beam in at least one possible moving track, the first signal received by the other communication device is sent by the communication device through the first wave beam, each of the at least one possible moving track takes the first wave beam as the initial wave beam; and
 wherein the determining the at least two signals received by the other communication device and the receiving sequence in which the other communication device receives the at least two signals further comprises: receiving from the other communication device a second acknowledging signal for acknowledging a second signal.

2. The method of claim 1, further comprising:
 determining the multiple wave beams to be formed by the at least one signal emitting source by the communication device.

3. The method of claim 2, wherein the determining the multiple wave beams to be formed by the at least one signal emitting source by the communication device comprises:
 determining multiple commands executable by the communication device;
 determining multiple possible moving tracks of the other communication device corresponding to the multiple commands; and
 determining the multiple wave beams to be formed by the at least one signal emitting source according to the multiple possible moving tracks, wherein each possible moving track corresponds to at least two wave beams in the multiple wave beams.

4. The method of claim 3, wherein the determining multiple possible moving tracks of the other communication device corresponding to the multiple commands comprises:
at least according to a current position of the other communication device relative to the communication device, determining the multiple possible moving tracks of the other communication device corresponding to the multiple commands.

5. The method of claim 1, wherein the method further comprises:
determining a first sequence corresponding to each of the multiple commands;
aiming at each command, according to at least two wave beams corresponding to one possible moving track corresponding to the command and a corresponding order of the at least two wave beams to the possible moving track, dividing a first sequence corresponding to the command into at least two subsequences corresponding to the at least two wave beams one to one; and
respectively modulating the at least two subsequences into at least two signals corresponding to the at least two wave beams.

6. The method of claim 5, wherein the determining the at least two signals received by the other communication device, and the receiving sequence in which the other communication device receives the at least two signals comprises:
receiving a second sequence from the other communication device, wherein the second sequence is made up of at least two subsequences carried in the at least two signals according to the receiving sequence by the other communication device.

7. The method of claim 6, wherein the executing the command comprises:
determining the command corresponding to the second sequence; and
executing the command.

8. The method of claim 5, wherein the executing the command comprises:
combining at least two subsequences carried in the at least two signals into a third sequence according to the receiving sequence;
determining the command corresponding to the third sequence; and
executing the command.

9. The method of claim 1, wherein the determining the at least two signals received by the other communication device and the receiving sequence in which the other communication device receives the at least two signals comprises:
receiving the at least two signals returned in sequence by the other communication device; and
determining the receiving sequence as a returning sequence in which the other communication device returns the at least two signals.

10. The method of claim 1, wherein the determining the at least two signals received by the other communication device and the receiving sequence that the other communication device receives the at least two signals comprises:
receiving the at least two signals and at least two receiving moments at which the other communication device respectively receives the at least two signals, which are both returned by the other communication device; and
according to the at least two receiving moments, determining the receiving sequence.

11. The method of claim 1, wherein the multiple different signals comprise at least one of electromagnetic wave signals, light signals or sound wave signals.

12. The method of claim 1, wherein the multiple different signals are visible light signals; and
wherein the sending the multiple different signals by the communication device comprises:
sending multiple visible light signals by the communication device through multiple light emitting diode (LED) light sources corresponding to different display regions in a display.

13. The method of claim 1, wherein the executing the corresponding command comprises:
at least according to the coverage areas of the at least two signals and the receiving sequence, determining a moving track of the other communication device;
executing a command corresponding to the moving track.

14. The method of claim 13, wherein the determining the moving track of the other communication device comprises:
determining at least two coverage areas of the at least two signals; and
according to the at least two coverage areas of the at least two signals and the receiving sequence, determining the moving track of the other communication device.

15. The method of claim 13, wherein the executing the command corresponding to the moving track comprises:
at least according to a device state of the communication device and the moving track, determining the command corresponding to the moving track under the device state; and
executing the command.

16. A communication device, comprising:
a memory that stores executable modules; and
a processor, coupled to the memory, that executes or facilitates execution of the executable modules, the executable modules comprising:
a sending module configured to send different signals through multiple wave beams, wherein the different signals have different coverage areas, and the multiple wave beams are formed by a signal emitting source in the communication device;
a first determining module configured to at least determine at least two signals in the different signals received by another communication device and a receiving sequence in which the other communication device receives the at least two signals, wherein the receiving sequence represents a passing sequence that the other communication device respectively moves among at least two coverage areas of the at least two signals; and
an executing module configured to execute a command at least corresponding to the coverage areas of the at least two signals and the receiving sequence,
wherein the sending module is further configured to send at least one first signal through at least one first wave beam;
wherein the at least one first wave beam comprises at least one initial wave beam in at least two wave beams corresponding to each of the multiple possible moving tracks;
wherein the first determining module is further configured to receive from the other communication device a first acknowledging signal for acknowledging a first signal;
wherein the sending module is further configured to send at least one second signal through at least one second wave beam, the at least one second wave beam comprises at least one next wave beam of a first wave beam in at least one possible moving track, the first signal received by the other communication device is sent by the sending module through the first wave beam, each of the at least one possible moving track takes the first wave beam as the initial wave beam; and wherein the first determining module is further configured to receive from the other communication device a second acknowledging signal for acknowledging a second signal.

17. The communication device of claim 16, wherein the executable modules further comprise:

a second determining module configured to determine the multiple wave beams to be formed by the signal emitting source.

18. The communication device of claim 17, wherein the second determining module comprises:

a first determining unit configured to determine multiple commands executable by the executing module;

a second determining unit configured to determine multiple possible moving tracks of the other communication device corresponding to the multiple commands; and a third determining unit configured to determine the multiple wave beams to be formed by the signal emitting source according to the multiple possible moving tracks, wherein, each possible moving track corresponds to at least two wave beams in the multiple wave beams.

19. The communication device of claim 18, wherein the second determining unit is configured to at least according to a current position of the other communication device relative to the communication device, determine the multiple possible moving tracks of the other communication device corresponding to the multiple commands.

20. The communication device of claim 16, wherein the executable modules further comprise:

a third determining module configured to determine a first sequence corresponding to each of the multiple commands;

a dividing module configured to aiming at each command, according to at least two wave beams corresponding to one possible moving track corresponding to the command and a corresponding order of the at least two wave beams to the possible moving track, divide the first sequence corresponding to the command into at least two subsequences corresponding to the at least two wave beams according to a one to one basis; and a modulating module configured to respectively modulate the at least two subsequences into at least two signals corresponding to the at least two wave beams.

21. The communication device of claim 20, wherein the first determining module is configured to receive a second sequence from the other communication device, and wherein the second sequence is made up of at least two subsequences carried in the at least two signals according to the receiving sequence by the other communication device.

22. The communication device of claim 21, wherein the executing module is configured to:

determine the command corresponding to the second sequence; and execute the command.

23. The communication device of claim 20, wherein the executing module is configured to:

combine at least two subsequences carried in the at least two signals into a third sequence according to the receiving sequence;

determine the command corresponding to the third sequence; and execute the command.

24. The communication device of claim 16, wherein the first determining module is configured to:

receive the at least two signals returned in sequence by the other communication device; and determine the receiving sequence as a returning sequence according to which the other communication device returns the at least two signals.

25. The communication device of claim 16, wherein the first determining module is configured to:

receive the at least two signals and at least two receiving moments that the other communication device respectively receives the at least two signals, which are both returned by the other communication device; and according to the at least two receiving moments, determine the receiving sequence.

26. The communication device of claim 16, wherein the different signals comprise at least one of an electromagnetic wave signal, a light signal and a sound wave signal.

27. The communication device of claim 16, wherein the different signals are visible light signals; and the sending module is configured to send the visible light signals by multiple light emitting diode (LED) light sources corresponding to different display regions in a display.

28. The communication device of claim 16, wherein the executing module comprises:

a fourth determining unit configured to, at least according to the coverage areas of the at least two signals and the receiving sequence, determine a moving track of the other communication device; and an executing unit configured to execute a command corresponding to the moving track.

29. The communication device of claim 28, wherein the fourth determining unit is configured to:

determine at least two coverage areas of the at least two signals; and according to the at least two coverage areas of the at least two signals and the receiving sequence, determine the moving track of the other communication device.

30. The communication device of claim 28, wherein the executing unit is configured to:

at least according to a device state of the communication device and the moving track, determine the command corresponding to the moving track under the device state; and execute the command.

31. A communication device, characterized by comprising:

an emitting source for at least one signal;

a memory configured to store at least one program; and a processor configured to execute the at least one program stored by the memory wherein the at least one program enables the processor to execute operations, comprising:

controlling the emitting source to send multiple different signals through multiple wave beams, wherein the multiple different signals have different coverage areas, and the multiple wave beams are formed by the signal emitting source in the communication device;

determining at least two signals in the multiple different signals received by another communication device and a receiving sequence in which the other communication device receives the at least two signals, wherein the receiving sequence represents a passing sequence that the other communication device respectively moves among at least two coverage areas of the at least two signals; and executing a command at least corresponding to the coverage areas of the at least two signals and the receiving sequence, wherein controlling the emitting source to send multiple different signals through multiple wave beams comprises: sending at least one first signal by the communication device through at least one first wave beam, wherein the at least one first wave beam comprises at least one initial wave beam in at least two wave beams corresponding to each of the multiple possible moving tracks;

wherein the determining the at least two signals received by the other communication device and the receiving sequence in which the other communication device receives the at least two signals comprises: receiving from the other communication device a first acknowledging signal for acknowledging a first signal;

wherein the controlling the emitting source to send multiple different signals through multiple wave beams further comprises: sending at least one second signal by the communication device through at least one second wave beam, the at least one second wave beam comprises at least one next wave beam of a first wave beam in at least one possible moving track, the first signal received by the other communication device is sent by the communication device through the first wave beam, each of the at least one possible moving track takes the first wave beam as the initial wave beam; and wherein the determining the at least two signals received by the other communication device and the receiving sequence in which the other communication device receives the at least two signals further comprises: receiving from the other communication device a second acknowledging signal for acknowledging a second signal.

32. The communication device of claim 31, where the operations further comprise:
determining the multiple wave beams to be formed by the at least one signal emitting source by the communication device.

33. The communication device of claim 32, wherein the determining the multiple wave beams to be formed by the at least one signal emitting source by the communication device comprises:
determining multiple commands executable by the communication device;
determining multiple possible moving tracks of the other communication device corresponding to the multiple commands; and
determining the multiple wave beams to be formed by the at least one signal emitting source according to the multiple possible moving tracks, wherein each possible moving track corresponds to at least two wave beams in the multiple wave beams.

34. The communication device of claim 31, where the operations further comprise:
determining a first sequence corresponding to each of the multiple commands;
aiming at each command, according to at least two wave beams corresponding to one possible moving track corresponding to the command and a corresponding order of the at least two wave beams to the possible moving track, dividing a first sequence corresponding to the command into at least two subsequences corresponding to the at least two wave beams one to one; and
respectively modulating the at least two subsequences into at least two signals corresponding to the at least two wave beams.

35. The communication device of claim 34, wherein the determining the at least two signals received by the other communication device, and the receiving sequence in which the other communication device receives the at least two signals comprises:
receiving a second sequence from the other communication device, wherein the second sequence is made up of at least two subsequences carried in the at least two signals according to the receiving sequence by the other communication device.

36. A computer readable storage device comprising executable instructions that, in response to execution, cause a device comprising a processor to perform operations, comprising:
controlling a communication device to send different signals through multiple wave beams, wherein the different signals have respective coverage areas, and the multiple wave beams are formed by at least one signal emitting source in the communication device;
determining respective signals in the different signals received by another communication device and a receiving sequence in which the other communication device receives the at least two signals, wherein the receiving sequence represents a passing sequence that the other communication device respectively moves among at least two coverage areas of the at least two signals; and
executing a command at least corresponding to the coverage areas of the at least two signals and the receiving sequence,
wherein the sending the multiple different signals by the communication device through the multiple wave beams comprises: sending at least one first signal by the communication device through at least one first wave beam, wherein the at least one first wave beam comprises at least one initial wave beam in at least two wave beams corresponding to each of the multiple possible moving tracks;
wherein the determining the at least two signals received by the other communication device and the receiving sequence in which the other communication device receives the at least two signals comprises: receiving from the other communication device a first acknowledging signal for acknowledging a first signal;
wherein the sending the multiple different signals by the communication device through multiple wave beams further comprises: sending at least one second signal by the communication device through at least one second wave beam, the at least one second wave beam comprises at least one next wave beam of a first wave beam in at least one possible moving track, the first signal received by the other communication device is sent by the communication device through the first wave beam, each of the at least one possible moving track takes the first wave beam as the initial wave beam; and
wherein the determining the at least two signals received by the other communication device and the receiving sequence in which the other communication device receives the at least two signals further comprises: receiving from the other communication device a second acknowledging signal for acknowledging a second signal.

37. The computer readable storage device of claim 36, the operations further comprising:
determining the multiple wave beams to be formed by the at least one signal emitting source by the communication device.

38. The computer readable storage device of claim 37, wherein the determining the multiple wave beams to be formed by the at least one signal emitting source by the communication device comprises:
determining multiple commands executable by the communication device;
determining multiple possible moving tracks of the other communication device corresponding to the multiple commands; and
determining the multiple wave beams to be formed by the at least one signal emitting source according to the multiple possible moving tracks, wherein each possible moving track corresponds to at least two wave beams in the multiple wave beams.

* * * * *